United States Patent
Keener et al.

(10) Patent No.: US 7,128,949 B2
(45) Date of Patent: Oct. 31, 2006

(54) SURFACE PRE-TREATMENT METHOD FOR PRE-COATED PRECIPITATION-HARDENABLE STAINLESS-STEEL FERROUS-ALLOY COMPONENTS AND COMPONENTS PRE-COATED THEREBY

(75) Inventors: Steven G. Keener, Trabuco Canyon, CA (US); Michael A. Mendoza, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/930,541

(22) Filed: Aug. 31, 2004

(65) Prior Publication Data

US 2006/0046080 A1  Mar. 2, 2006

(51) Int. Cl.
*B05D 3/02* (2006.01)
*C21D 1/00* (2006.01)

(52) U.S. Cl. ............... 427/385.5; 427/372.2; 148/516; 148/579; 148/622

(58) Field of Classification Search ................ 148/516, 148/559, 579, 622, 320; 427/372.2, 384, 427/385.5, 393.5
See application file for complete search history.

(56) References Cited

U.S. PATENT DOCUMENTS

| | | | |
|---|---|---|---|
| 4,659,268 A | 4/1987 | Del Mundo et al. | |
| 4,717,302 A | 1/1988 | Adams et al. | |
| 4,778,637 A | 10/1988 | Adams et al. | |
| 4,861,211 A | 8/1989 | Dunsmore | |
| 4,868,066 A | 9/1989 | Whitmore | |
| 4,971,635 A * | 11/1990 | Guhde et al. | ................ 148/267 |
| 5,614,037 A | 3/1997 | Keener | |
| 5,858,133 A | 1/1999 | Keener | |
| 5,922,472 A | 7/1999 | Keener | |
| 5,944,918 A | 8/1999 | Keener | |
| 6,171,649 B1 | 1/2001 | Keener et al. | |
| 6,235,407 B1 | 5/2001 | Ogata et al. | |
| 6,274,200 B1 | 8/2001 | Keener et al. | |
| 6,494,972 B1 | 12/2002 | Keener et al. | |
| 6,499,926 B1 | 12/2002 | Keener | |
| 2004/0163740 A1 * | 8/2004 | Keener et al. | ............. 148/537 |
| 2004/0247835 A1 * | 12/2004 | Keener | ...................... 428/160 |

FOREIGN PATENT DOCUMENTS

DE  196 25 548 A1  1/1998
EP  0 342 976 A  11/1989

* cited by examiner

*Primary Examiner*—Michael E. Lavilla
(74) *Attorney, Agent, or Firm*—Alston & Bird LLP

(57) ABSTRACT

The present invention relates to the use of a pre-coating process, which utilizes metallic plating as a surface pre-treatment for a ferrous-alloy precursor prior to applying a corrosion-inhibiting coating to improve the overall corrosion protection of the pre-treated and pre-coated component. Preferably the ferrous-alloy precursor is a heat-treatable, precipitation-hardenable stainless-steel material and the pre-treatment is a cadmium or a zinc-nickel alloy plating without a subsequent chromate or phosphate seal finish.

30 Claims, 3 Drawing Sheets

SURFACE PRE-TREATMENT METHOD FOR PRE-COATED PRECIPITATION-HARDENABLE STAINLESS-STEEL FERROUS-ALLOY COMPONENTS AND COMPONENTS PRE-COATED THEREBY

BACKGROUND OF THE INVENTION

This invention relates to the preparation of pre-coated ferrous-alloy components. More particularly, the present invention relates to the use of a surface preparation as a preliminary step in a pre-coating process to improve the corrosion protection and other properties of coated ferrous-alloy components.

Aircraft manufacturers use a variety of different ferrous and non-ferrous metals in the fabrication of aircraft components. Commonly assigned U.S. Pat. No. 5,614,037 discloses a method for pre-treating aluminum and aluminum-alloy articles to obviate the use of wet sealants and other coatings for protection against corrosion damage.

Ferrous-alloy metals such as carbon steels and aircraft-quality low-alloy stainless-steels, such as, for example, Aermet 100, HY-TUF™, 300M, H-11, HP9-4-30, 52100, 1095, 4130, 4135, 4140, 4330V, 4340, 6150, 8740, 18-8, 17-4PH, 17-7PH, 15-5PH, PH 13-8Mo, PH 15-7Mo, A-286, etc. are often used as primary structural aircraft components. Typically, these ferrous-alloy components, including fasteners, bearing, struts, etc., are often protected from wear and corrosion by applying an overplate of cadmium in time-consuming combination with other protective finishes such as chrome plate. These fasteners are often installed using a labor-intensive, time-consuming, and, consequently, very costly wet-sealant process.

However, cadmium is suspected of being a carcinogen and is a known toxic element. Cadmium and cyanide, used in the electrodeposition of cadmium, have been listed as two of the seventeen chemicals targeted by the U.S. Environmental Protection Agency (EPA) for reduction. Additionally, many cadmium-plating specifications require a chromate coating or other subsequent seal or finish to improve corrosion resistance. This adds another toxic metal (hexavalent chromium) that must be treated before discharge. Many European nations have passed legislation restricting import of products with cadmium, and the European Economic Community (EEC) has prohibited use of cadmium-plated products. Such concerns have resulted in the search for a replacement coating or finish.

Although several candidate coatings have been identified, no single replacement coating or system has been found that meets all of the engineering requirements. Earlier tests that formed the foundation for U.S. Pat. No. 5,614,037, as well as also U.S. Pat. Nos. 5,858,133, 5,922,472, 5,944,918, 6,403,230, and 6,221,177 demonstrated an equivalent level, if not improved, of corrosion protection was achieved by pre-coating non-ferrous-alloy components in lieu of the inferior practice of applying wet sealant to the component during its assembly. See also commonly assigned U.S. Pat. Nos. 6,274,200 and 6,494,972.

However, it has been shown that, with respect to pre-coated components having different ferrous-alloy substrate materials, while the surrounding structural components are adequately protected to equivalent levels from corrosion attack, the coating itself that is applied to some of the components in known pre-coating processes may be adversely affected from an appearance standpoint and may interact with the substrate material to a degree that is visually perceptible. Over a prolonged period of time, the possibility exists that the adverse effect of this interaction could not only manifest itself in the coating's visual appearance but may also have an effect on the coating's integrity, possibly leading to a compromised corrosion protection condition.

SUMMARY OF THE PRESENT INVENTION

The present invention is related to the discovery that, by utilizing a particularly selected surface pre-treatment process for heat-treatable, precipitation-hardenable stainless-steel ferrous-alloy components prior to applying a corrosion-inhibiting coating, a significantly improved, pre-determined, final pre-coated condition can be achieved. This improved or enhanced final condition results from the improved compatibility or inter-relationship afforded by the pre-treatment process between the compositions of the subsequently applied protective coating and the component substrate yielding an improved pre-coated component.

More specifically, the present invention is a method of pre-treating ferrous-alloy components first with a surface pre-treatment operation in the form of a metal plate, preferably a cadmium plate or a zinc-nickel (Zn—Ni) alloy plate without any subsequent chromate sealant, followed by a pre-coating process, which applies a corrosion-resistant organic coating atop the metal plate. This pre-coating process obviates the need for the use of wet sealant during the fastener installation and component assembly process. Further, the process of applying an intermediate pre-treatment surface operation, such as cadmium plating, in lieu of simply cleaning or stripping the substrate's surface prior to the pre-coating revealed equally acceptable results when compared to the known pre-coating process.

According to one embodiment, the present invention comprises a method for pre-coating a ferrous-alloy structural component comprising the steps of providing a structural component made from a ferrous-alloy precursor having a pre-determined heat-treatment temperature and subjecting the component to a metallic plate pre-treatment. The metallic plate-treated component is optionally subjected to a hardening treatment. The plated component is cleaned by light mechanical abrasion. A curable organic coating material, having a non-volatile portion that is curable at about the pre-determined ferrous-alloy heat-treatment temperature, is then applied to the cleaned, plated component. The coating material and the pre-treated, plated component are substantially simultaneously cured by heat-treating the ferrous-alloy precursor.

According to another embodiment, the present invention comprises a method for pre-coating a ferrous-alloy structural component comprising the steps of providing a structural component made from a ferrous-alloy precursor having a pre-determined heat-treatment temperature and subjecting the component to a metallic plate pre-treatment. The metallic plate is applied to a thickness of greater than 0.0002 inch, and preferably from greater than 0.0004 inch to about 0.0008 inch. The metallic plate-treated component is optionally subjected to a hardening treatment. A curable organic coating material, having a non-volatile portion that is curable at about the pre-determined ferrous-alloy heat-treatment temperature, is then applied to the cleaned, plated component. The coating material and the plated component are substantially simultaneously cured by heat-treating the ferrous-alloy precursor.

Cadmium (Cd) plating pre-treatment is applied per the requirements of AMS-QQ-P-416A, Type I, Class 1, 2 or 3 specification, i.e., the plating thickness is a minimum of 0.0002 inch, which could range from about 0.0002 inch to about 0.0008 inch, however without the further, subsequent application of a chromate or phosphate seal finish. In practice, thicknesses of less than about 0.0004 may be difficult to obtain using mass production techniques. Thicknesses greater than 0.0004 inch, and particularly from greater than 0.0004 inch to about 0.0008 inch, are desirable because of the ease of application at those thicknesses. Alternative pre-treatment processes may be utilized other than the cadmium plating process, such as the zinc-nickel (Zn—Ni) alloy coating process per the requirements of BAC 5637 specification.

Regardless of the specified pre-treatment metal plate thickness, it has been found that subjecting the pre-treated, plated component to a light mechanical abrasion step improves the adhesion of the subsequently applied coating.

For pre-coating, the component then is subjected to the preferred pre-coating process of applying Hi-Kote®1 coating following the steps as previously claimed in the patents delineated above.

According to another embodiment, the present invention comprises a corrosion-resistant structural ferrous-alloy component prepared by providing a structural component made from a ferrous-alloy precursor having a pre-determined heat-treatment temperature and subjecting the component to a plate pre-treatment. The plated component is cleaned by mechanical abrasion. A curable organic coating material is provided having a non-volatile portion that is curable at about the pre-determined ferrous-alloy heat-treatment temperature and is then applied to the component. The coated component is then heat-treated to substantially simultaneously cure the coating and the component substrate.

According to a further embodiment, the present invention comprises a heat-treatable, precipitation-hardenable stainless-steel ferrous-alloy structural component comprising a ferrous-alloy precursor having a pre-determined heat-treatment temperature, a metallic plate pre-treatment finish on the ferrous-alloy precursor and a curable, organic coating covering the metallic plate. The metallic plate is greater than 0.0002 inch thick, optionally greater than 0.0003 inch, and preferably from greater than 0.0004 inch to 0.0008 inch thick. The organic coating is preferably made from a material having a non-volatile portion that is curable at about the pre-determined ferrous-alloy heat-treatment temperature, wherein the precursor and the coating are substantially simultaneously heat-treated.

The plated and pre-coated structural components may be used in a wide variety of applications. The components may be of particular usefulness in the construction and repair of aircraft and aerospace structures.

DETAILED DESCRIPTION OF THE PRESENT INVENTION

The present invention is directed to an improved method of pre-treating a heat-treatable, precipitation-hardenable stainless-steel ferrous-alloy substrate by preparing the surface of the ferrous-alloy substrate prior to a ferrous-alloy substrate pre-coating process. Known patents disclose a pre-coating process as it is directly applied to ferrous-alloy substrates using any one of a variety of conventional surface treatments primarily to satisfy industry accepted surface cleaning requirements. See U.S. Pat. Nos. 6,274,200 and 6,494,972.

Figure 1:
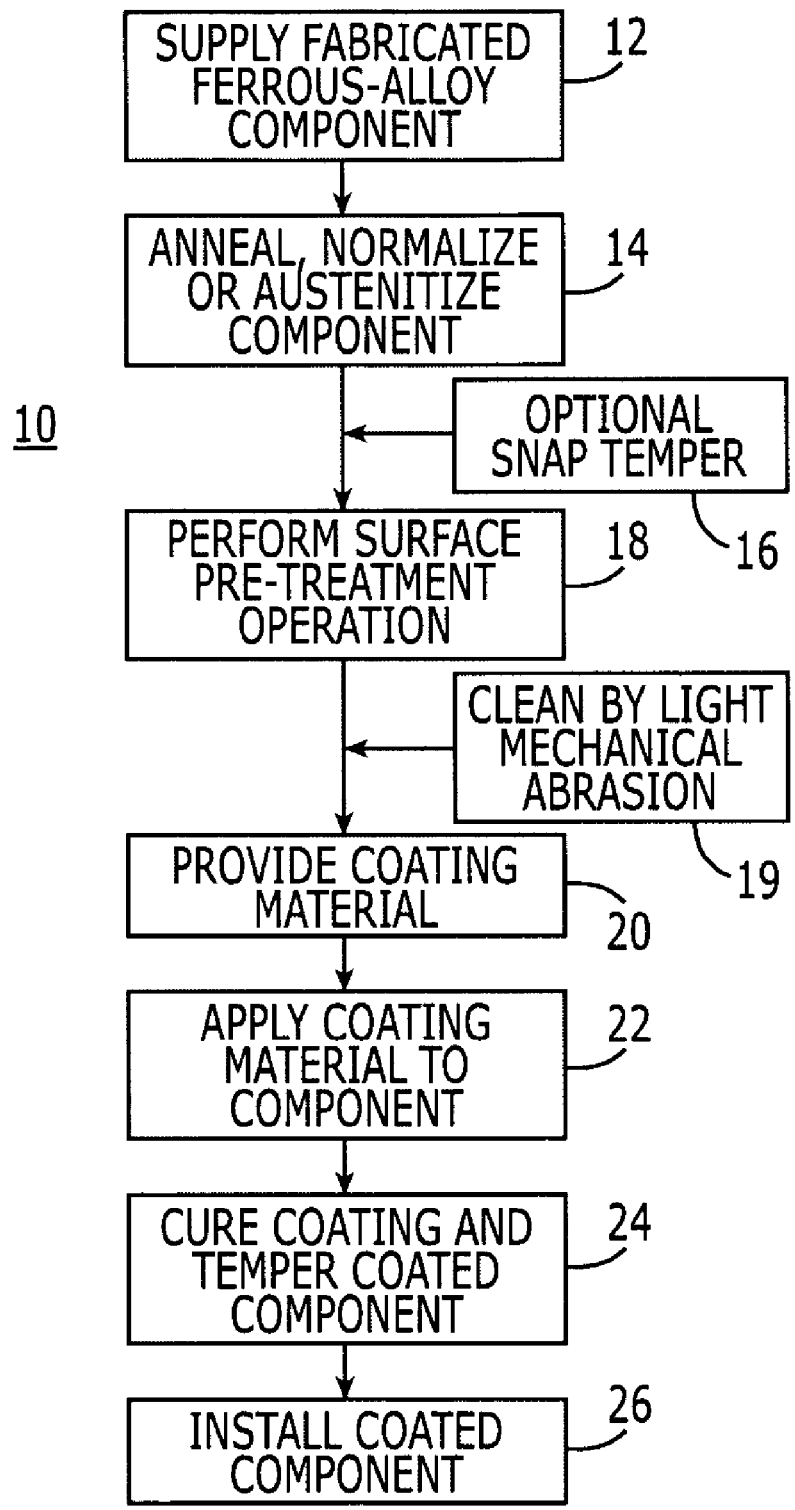
FIG. 1 presents a flow chart, which delineates the steps outlined by the process described in this disclosure including the step of performing the specified surface pre-treatment operation.

As shown by the process 10 outlined in FIG. 1 a ferrous-alloy component 12 is annealed, normalized or austenitized 14 followed by an optional snap tempering step 16. The metallic plate pre-treatment operation 18 is then applied to the surface of the component. A light mechanical abrasion step 19 is optionally used to clean the applied plate finish and improve the adhesion of the subsequently applied corrosion-inhibiting coating. An organic coating corrosion-resistant material is provided 20 and then applied 22 to the cleaned metallic-plated component followed by a curing or tempering treatment 24 designed to substantially simultaneously treat both the component and the organic coating. The treated pre-coated component is then ready for installation 26.

Figure 2:
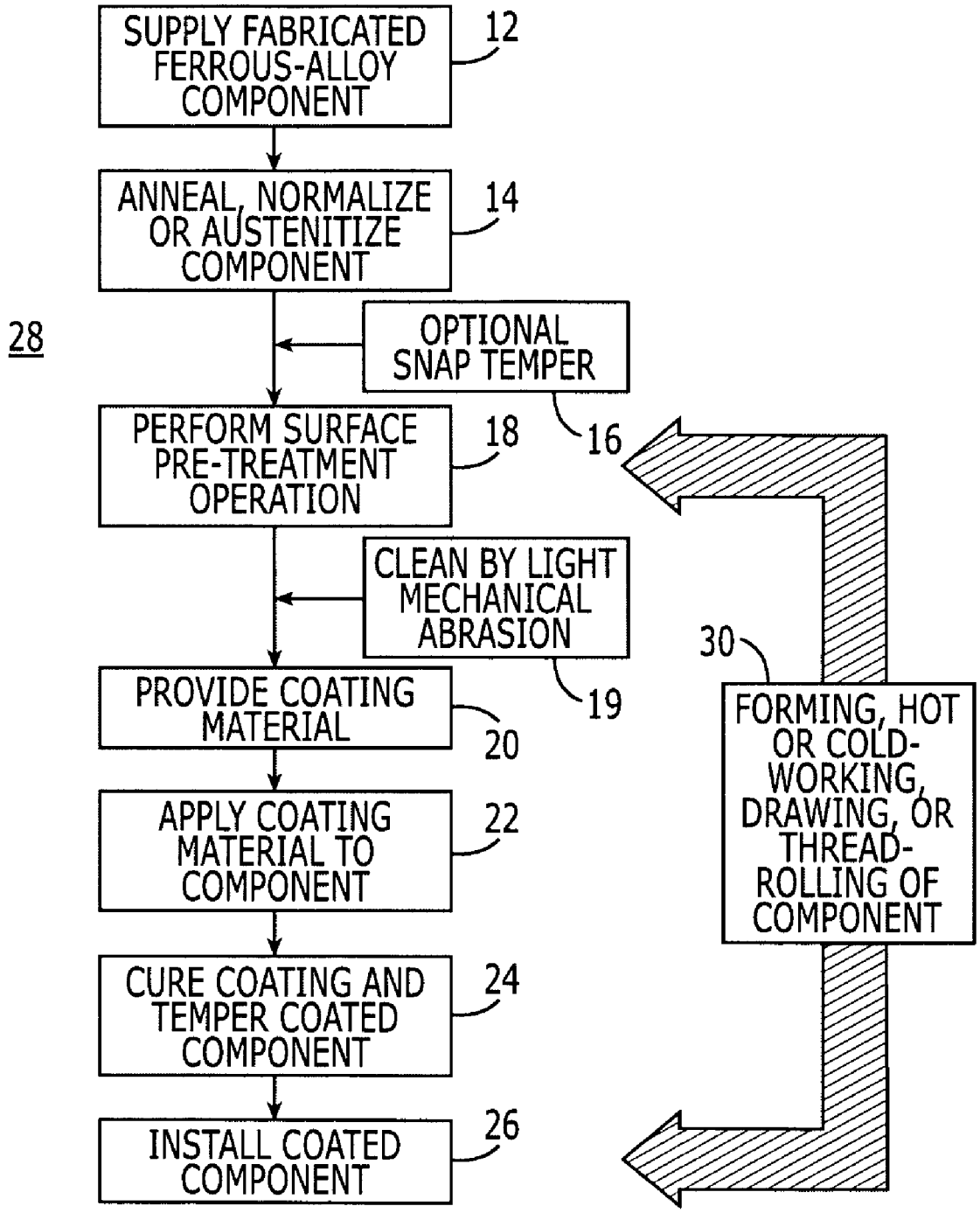
FIG. 2 outlines an alternative embodiment in accordance with the invention, which includes an optional forming or cold-working step either before or after the surface pre-treatment operation.

FIG. 2 depicts a process 28 substantially similar to that shown in FIG. 1 with the addition of a further forming or fabrication step 30 to be included in the process 28. While the cold-working forming step 30 may occur after the thermal treatment step 24, step 30 preferably occurs at some point before the thermal treatment step 24.

Cadmium (Cd) plating pre-treatment is applied per the requirements of AMS-QQ-P-416A, Type I, Class 1, 2 or 3 specification, corresponding to minimum plating thicknesses of 0.0005, 0.0003, and 0.0002 inch, respectively. Thus, the plating thickness is within the range of about 0.0002 inch to 0.0008 inch, however without the further, subsequent application of a chromate or phosphate seal finish. Alternative pre-treatment processes may be utilized other than the cadmium plating process, such as the zinc-nickel (Zn—Ni) alloy coating process per the requirements of BAC 5637 specification.

The mechanical abrasion step 19 is a mechanical cleaning step to remove any scale or oxidation from the component's surface that may have been produced as a result of its thermal treatment. It is preferred that the component not be pickled. An exemplary cleaning is that of military specification MIL-S-5002.

As shown by the process outlined in FIGS. 1 and 2, the coating material is applied to the pre-treated fastener in coating step 22. Any suitable coating process can be used, such as, for example, dipping, spraying, brushing, or a fluidized-bed method. In one preferred process or approach, the solution of coating material dissolved in a solvent is sprayed onto the pre-treated fasteners. Once the fasteners are coated, the solvent is removed from the as-applied coating by a quick drying or "flash cure" step, either at room temperature or slightly elevated temperature, so that the coated article is dried to a tack-free condition to enable handling. Preferably, evaporation of solvent is accomplished by a flash cure, which could entail exposure to 200° F. for about two minutes. The coated component is still not suitable for service at this point, because the coating is neither sufficiently nor optimally cured and adhered to the pre-treated ferrous-alloy component. Furthermore, in this condition the coating itself is not sufficiently coherent to resist corrosion or mechanical damage in service.

In a preferred embodiment, Hi-Kote®1 coating is used. Hi-Kote®1 is a phenolic resin-based organic coating from Hi-Shear Corporation, Torrance, Calif. According to EDS analysis in a scanning electron microscope, the heavier elements of Hi-Kote®1 are present in the following amounts by weight: Al, 82.4 percent; Cr, 2.9 percent; Fe, 0.1 percent; Zn, 0.7 percent; and Sr, 13.9 percent. The lighter elements such as carbon and oxygen were detected in the coating but were not reported because the EDS analysis for such elements is not generally accurate.

The base, ferrous-alloy metallic substrate of the pre-treated fastener and the applied coating are together heated to a suitable elevated temperature in a cure/temper step 24, to achieve two results substantially simultaneously. In this single step, the ferrous-alloy material is treated to its final, desired strength state, and the coating is cured to its desired final cross-linked or bonded state.

Preferably, the temperature and time associated with the treatment of step 24 is selected to be that required to achieve the desired properties of the ferrous-alloy metal, as provided in the industry-accepted and proven process standards for that particular ferrous-alloy material. Surprisingly, this treatment is typically not that specified by the coating manufacturer and may not produce the most optimal cure state for the coating, but it has been determined that the thermal treatment of the metal is less forgiving of slight variations from the optimal treatment than is the curing treatment of the organic coating. That is, according to the present invention, the curing of the coating can sustain larger variations in time and temperature with acceptable results than can the heat-treatment process of the ferrous-alloy material. Contrary to expectations and manufacturer's specifications, the coating cured by the non-recommended procedures exhibits acceptable adhesion to the ferrous-alloy substrate. The coating also exhibits other desirable properties during the life of the coated component. Thus, the use of the recommended embrittlement relief thermal treatment process of the metal yields the optimal physical properties of the metal, and acceptable coating properties. In the case of one preferred A-286 heat-treatable, precipitation-hardenable stainless-steel ferrous-alloy substrate and Hi-Kote®1 coating, the preferred thermal treatment is the embrittlement relief treatment process of the A-286 alloy, namely about 4 hours to about 5 hours at about 350° F. to about 400° F.

Figure 3:
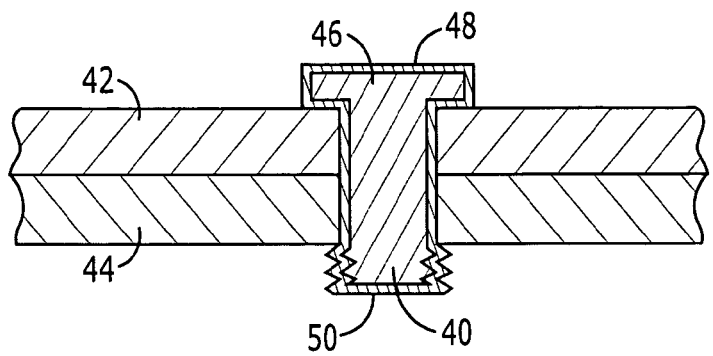
FIG. 3 is a schematic cross-sectional view of a protruding-head fastener in accordance with the invention used to join two pieces, without a female component.
Figure 4:
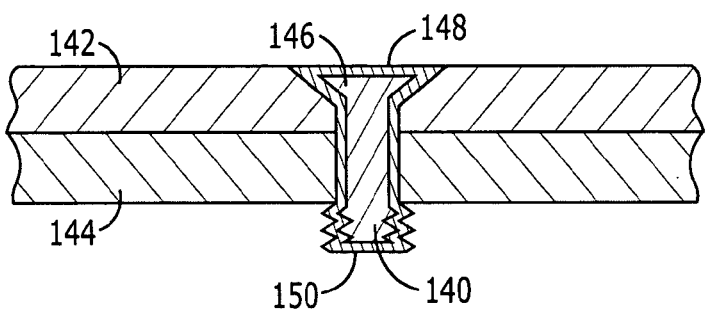
FIG. 4 is a schematic cross-sectional view of a flush-head fastener in accordance with the invention used to join two pieces, without a female component; and, FIG. 5 is a schematic view of a flush-head fastener in accordance with the invention of FIG. 4, with a female component.
Figure 5:
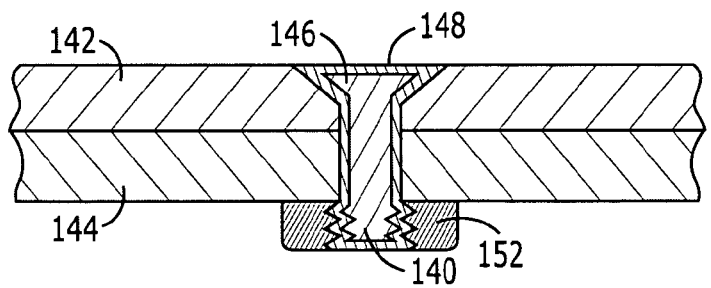

Thus, the thermal treatment procedure 24 involves a significantly different temperature than is recommended by the manufacturer for the organic phenolic coating. There was initially a concern that the higher temperature, beyond that required for the standard curing of the coating, would degrade the coating and its properties during service. Surprisingly, this concern proved to be unfounded. The final coating 48, shown schematically in FIGS. 3 and 148 shown schematically in FIGS. 4 and 5, is strongly adherent to the ferrous-alloy metal substrate and is also strongly coherent and cross-linked. In FIGS. 3–5, the thickness of the coatings 48 and 148 is exaggerated so that it is visible. In reality, the coating is typically about 0.0003 inch to about 0.0005 inch thick after treating in step 24.

After coating and drying, the pre-coated and fully-treated component is ready for the installation step, (See 28, FIGS. 1 and 2). The pre-coated component is installed in the manner appropriate to its type and use. In the case of the fastener, such as the depicted bolt 40, the bolt is placed through aligned bores in the two mating pieces 42 and 44 placed into intimate contact, as shown in FIG. 3. As shown in FIG. 5, the remote protruding threaded end 150 of the bolt 140 has a female component, such as nut or collar installed so that the pieces 142 and 144 are mechanically captured between the pre-manufactured head 146 and a female component or threaded nut 152 of the bolt. FIG. 5 illustrates the threaded nut 140 for the case of the flush head, and the general assembly configuration of the bolts of the other types of bolts is similar. The coating 148 remains tightly adherent on the bolt even after assembly, as shown in FIG. 5.

As mentioned above, the installation step reflects one of the advantages of the present invention. If the coating were not applied to the fastener, it would be necessary to place a viscous wet polysulfide sealant material into the hole and onto the bolt prior to its installation, which in turn coats the contacting adjacent surfaces of the fastener and surrounding, adjacent structure. The wet polysulfide sealant material is potentially toxic to workers, messy, difficult to work with, and necessitates the use of extensive cleanup tools as well as exposing surfaces of the pieces 42 and 44 to caustic chemical solutions after installation of the fastener. Moreover, it has been observed that the presence of residual wet polysulfide sealant inhibits the adhesion of later-applied paint and other topcoats applied over the fastener heads and surrounding structure.

The pre-coating process of the present invention overcomes these problems confronted by the use of wet polysulfide sealants. According to the process of the present invention, use of wet sealant is not needed or applied during fastener installation. Additionally, the later-applied paint or other top coats adhere well over the pre-coated fastener heads.

By performing a specific pre-treatment surface operation of the ferrous-alloy material prior to the pre-coating process, adverse interaction between subsequently applied coating material and substrate is significantly reduced or eliminated. Instead of simply cleaning or stripping the component's surfaces prior to pre-coating, according to one aspect of the invention, using a cadmium plating, without a subsequent chromate seal, exhibits not only excellent additional corrosion protection but reduces or eliminates the interaction between the subsequently applied coating and the component's substrate. The process of applying an intermediate pre-treatment surface operation, such as cadmium plating, in lieu of simply cleaning or stripping the substrate's surface prior to the pre-coating revealed superior results when compared to the known pre-coating process. In addition, it has also been discovered that a zinc-nickel (Zn—Ni) plating surface preparation, also can mitigate effects of the subsequently applied coating and substrate interaction.

The present invention contemplates using any high-strength, ferrous-alloy material compatible with the selected aluminum-containing, organic phenolic corrosion-inhibiting coating formulation requiring a subsequent aging/curing period for the pre-coated component. The subsequent aging/curing period can be conducted at an elevated temperature commensurate with the ferrous-alloy material's thermal treatment protocol to facilitate curing of the coating. The coating thickness achievable by the present invention may vary slightly according to the preferred end-result characteristics of the pre-coated component, but preferably coating thicknesses range from about 0.0004 inch to about 0.0006 inch.

One preferred embodiment of the invention relates to the preparation of fasteners, such as rivets and threaded bolts, and the following discussion will emphasize such components. The use of the invention is not limited to fasteners, and instead is more broadly applicable to a larger group of components. However, its use with fasteners offers particular advantages that will be discussed. The fasteners contemplated by the present invention include screws, bolts, pins, rivets, etc., which may have threads, and may have female mating components such as nuts, collars, lock washers, etc.

The process of the present invention is also useful for ferrous-alloy components used in aircraft construction such as, for example, landing gears, machined fittings, as well as other high-strength structural components such as fasteners and bearings. Fasteners are understood to mechanically join the various structural elements and subassemblies of aircraft. For example, a large transport aircraft, such as the C-17 typically includes over 1,000,000 total fasteners such as bolts, screws, and rivets. According to previous techniques, when such fasteners were formed from a ferrous-containing alloy, to insure protection from corrosion, each fastener was processed with a suitable protective plating such as cadmium or chrome. In addition, to further facilitate corrosion protection, such fasteners were typically installed with a wet sealant that was toxic and required special handling during application. The wet sealant further required careful and expensive cleaning and special removal and handling as a hazardous waste.

Typical wet sealants include, two-part, manganese-cured, polysulfide sealants containing an additional quantity of soluble metallic chromates. The wet sealants require refrigeration storage until such time when they are required for use on the shop floor, which contributes to their costly use. These sealants are flowable viscous materials which are applied by brush, spatula, roller or extrusion gun. Examples are P/S 1422 or 870 C corrosion-inhibiting sealants produced by PRC-Desoto, Glendale, Calif. By contrast, the process of the present invention pre-treats the components first with a surface pre-treatment operation in the form of a metal plate, preferably a cadmium plate without any subsequent chromate sealant, followed by the pre-coating process, which applies a corrosion-resistant organic coating. This pre-coating process obviates the need for the use of wet sealant during the fastener installation and component assembly process.

The ferrous-alloy components of the present invention achieve their full, required strength and other metallurgical properties produced by a thermal treatment as well as curing of the coating. Achieving a specified strength level of the substrate is important, because users of the components, such as the customers of aircraft, will not permit a sacrifice of mechanical performance in order to achieve improved corrosion protection. In the past, they have required both acceptable mechanical performance and also the use of various harsh full-up production plating treatments in addition to the use of wet sealants to achieve acceptable corrosion protection.

In the present approach, on the other hand, the aircraft structural components have both acceptable mechanical performance and a less toxic and costly method for providing acceptable corrosion protection. It is known to those skilled in the field of metals finishing, and in particular metal plating processes, that minimal benefits for wear and corrosion protection are associated with relatively thin, metal plate finishes. Yet the true benefit as incorporated in the processing methodology of the present invention is the ability that is afforded to facilitate the more beneficial aspects of the subsequent pre-coating process. In other words, the general use of various relatively thin, metal plate finishes has shown to have greatly reduced benefits from wear resistance and corrosion protection standpoints among other considerations. However, when the pre-treatment metal plating process is used in conjunction with the subsequent application of a corrosion-inhibiting coating, as is the case in the pre-coating process of the present invention, superior corrosion protection is achieved, while mitigating the adverse interaction between the coating and substrate, which the metal plate pre-treatment operation is intended to achieve.

With regard to aircraft bearings and fasteners, the elimination of the requirement for the wet-sealant installation approach for more than 1,000,000 fasteners in a large cargo aircraft offers a significant cost savings of several hundreds of thousands of dollars per aircraft. The elimination of the use of wet sealants also improves the overall quality and workmanship in the fastener installation, and resulting joint integrity as there is no possibility of missing or overlooking some of the fasteners as the wet sealant is applied. Further, the pre-coated, fully-treated fasteners provide equivalent or enhanced protection from corrosion during service than the uncoated, wet-installed fasteners.

The preferred bolts, such as those represented in FIGS. 3–5, preferably are manufactured from a heat-treatable, precipitation-hardenable stainless-steel ferrous-alloy material. As used herein, "ferrous-alloy" or "ferrous-containing alloy" means that the material has more than about 50 percent by weight iron. Typically, the ferrous-alloy material has at least about 50 percent by weight of iron, with the balance being alloying elements and a minor amount of impurities. Alloying elements are added in precisely controlled amounts to modify the properties of the ferrous-alloy material as desired. Alloying elements that are added to iron to modify its properties include, for example, carbon, manganese, silicon, nickel, chromium, and molybdenum.

In one embodiment, the ferrous-alloy material is a heat-treatable, precipitation-hardenable stainless-steel material. A precursor component is first fabricated to a desired shape, for example, a fastener such as a bolt. In order to impart strength to the precursor component, the component must then be heat-treated. In the solution heat-treating or austenitizing/hardening process, the component is heated to an elevated temperature where a Face-Centered-Cubic phase called "austenite" is formed. While still at this elevated temperature, the component is rapidly quenched, reverting the austenite to a Body-Centered-Tetragonal phase called "martensite." Untempered martensite is a hard, brittle phase and must be softened by a process called "tempering." In the tempering process, the austenitized and quenched component is subjected to an elevated temperature, which is much lower than the austenitizing temperature. This tempering process softens the precursor component and imparts toughness.

Tempering must occur shortly after the austenitizing and quenching procedure, or fissures or cracking may occur leading to component failure. The present invention contemplates providing, as a tempering step, the necessary and required hydrogen embrittlement relief (not specifically just conventional "tempering" of the metal substrate) to cure the metal as well as the subsequent organic coating. To achieve the desired hydrogen embrittlement, the duration for the treatment will range from about 4 to up to about 9 hours depending upon the alloy selected. Further, if the part must be processed (i.e., straightened, coated, etc.) prior to a full temper, the component can be given an intermediate and abbreviated "snap" temper. This snap temper softens the ferrous-alloy slightly and reduces the likelihood of cracking.

Collectively, all of the processing steps leading to the strengthening of the material or component are generally termed "heat-treating" or "thermal treatment", wherein the component is subjected to one or more periods of exposure to an elevated temperature for a duration of time, with heating and cooling rates selected to aid in producing the component's desired final, metallurgical properties. The temperatures, times, and other parameters required to achieve particular properties are known to those skilled in the metallurgy field and are available in reference documents for standard ferrous-alloy materials.

A preferred, specific heat-treatable, precipitation-hardenable stainless-steel ferrous-alloy material for fastener applications is the A-286 alloy (UNS K66286) per AMS5731, which has a nominal composition of 0.03 to 0.05 percent carbon, 15.0 percent chromium, 26.0 percent nickel and 1.25 percent molybdenum, with the balance being iron plus minor impurities. Other contemplated heat-treatable, precipitation-hardenable stainless-steel ferrous-alloys include, but are not limited to, 18-8, 17-4 PH, 17-7 PH, 15-5 PH, PH 13-8Mo, PH 15-7Mo, Custom 450, and Haynes 556 series heat-treatable precipitation-hardenable, stainless-steel ferrous-alloys. The A-286 alloy is available commercially from several companies. After fabricating the alloy to the desired shape such as a fastener like those shown in FIGS. 3–5, the A-286 alloy may be fully annealed, normalized and stress relieved. This state is usually obtained following fabricating including machining, forging, or otherwise forming the fastener into the desired shape. Following these steps, the ferrous-alloy material is hardened or austenitized, quenched and, if necessary, "snap" tempered. This condition is termed the "untreated state" herein, as it precedes the final, full-tempering heat-treatment soak required to optimize the strength and other properties of the material. The component may be subjected to multiple forming operations and periodically re-annealed as needed, prior to the strengthening or hardening, heat-treatment processes.

The metallic plate pre-treatment operation 18 is then applied to the surface of the component. For instance, cadmium (Cd) plating pre-treatment may be applied per the previously mentioned AMS-QQ-P-416A specification, with a thickness of about 0.0002 inch to about 0.0008 inch, without the subsequent application of a chromate or phosphate seal finish. Alternatively, a zinc-nickel (Zn—Ni) alloy coating process per the requirements of BAC 5637 specification may be used. A light mechanical abrasion step 19 is used to clean the applied plate finish and improve the adhesion of the subsequently applied corrosion-inhibiting coating.

A coating material is provided 20, preferably in solution so that it may be readily and evenly applied. The usual function of the coating material is to protect the base metal to which it is applied from corrosion, including, for example, conventional electrolytic corrosion, galvanic corrosion, and stress corrosion. The coating material is a formulation that is primarily of an organic composition, but which may contain additives to improve the properties of the final coating. In one preferred embodiment, the coating is initially dissolved in a carrier or solvent liquid so that it can be applied to a substrate. After applying, the coating material is curable to effect structural changes within the organic component, typically cross-linking of the organic molecules to improve the adhesion and cohesion of the coating. The coating layer 48, 148 on the preferred fastener is shown in FIGS. 3–5.

Such a curable coating is distinct from a non-curable coating, such as a lacquer, which has different properties and is not as suitable for the present, corrosion-protection application. With a non-curable coating such as a lacquer, there is no need to heat the coated article to elevated temperatures for curing. Thus, the over-aging problems associated with the use of curable-coating materials, and which necessitate the present invention, simply do not arise. It is further understood that optional industry accepted cleaning steps may be required to prepare the base metal for the plate. Such cleaning procedures are those well known to those skilled in the coating field and include the use of solvents, acids, alkalines, and mechanical methods.

The present process contemplates a number of curable organic coating materials. A typical and preferred coating material has a phenolic resin mixed with one or more plasticizers, other organic components such as polytetrafluoroethylene, and inorganic additives such as aluminum powder and/or strontium chromate. These coating components are preferably dissolved in a suitable solvent present in an amount to produce a desired consistency based upon the desired end use.

For the coating material just discussed, one useful preferred solvent is a mixture of ethanol, toluene, and methyl ethyl ketone (MEK). A typical, sprayable coating solution has about 30 percent by weight ethanol, about 7 percent by weight toluene, about 45 percent by weight methyl ethyl ketone (MEK) as the solvent, about 2 percent by weight strontium chromate, and about 2 percent by weight aluminum powder, with the balance being phenolic resin and plasticizer. Optionally, a small amount of polytetrafluoroethylene may be added. Such a product is available commercially as "Hi-Kote®1" from Hi-Shear Corporation, Torrance, Calif. The coating material has a standard elevated temperature curing treatment of 1 hour at 400° F.±25° F., as recommended by the manufacturer.

The following example serves only to further illustrate aspects of the invention and should not be construed as limiting the present invention.

EXAMPLE

A comparative 2000 hour salt spray exposure test performed on A-286 stainless-steel HSR217AP6-9 Hi-Set® fasteners from Hi-Shear Corporation, Torrance, Calif., having various surface preparation methods employed prior to the application of Hi-Kote®1 aluminum pigmented coating. Hi-Kote®1 is a phenolic resin-based aluminum coating as described above, and has been demonstrated to possess excellent corrosion protection when subjected to 2000-hour salt spray corrosion evaluations, as well as high temperature resistance (to 400° F.), excellent resistance to fuel, hydraulic fluids, solvents when applied on a wide variety of metallic surfaces.

The salt spray evaluation testing was performed in accordance with ASTM B 117 apparatus and standard test method procedures. Aluminum-alloy material test specimen assemblies, each containing six fastener installations, were placed at a 15-degree angle to the horizontal inside the salt spray test chamber for a period of 2000 hours.

All fasteners used in the evaluation were selected from the same manufacturing lot of Hi-Set® fasteners and represented standard manufacturing processes, which included the application of Hi-Kote®1 coating onto A-286 stainless-steel material for the control specimens. Additional derivative samples were processed with modifications to the A-286 material preparation prior to the application of Hi-Kote®1 coating, which included various plating alternatives as well as wet-sealant installation of the standard production Hi-Set® fasteners. A separate test coupon assembly containing installations of a different type of production Hi-Kote® 1-coated titanium-alloy material fastener was selected for a comparison baseline of corrosion prevention results and characteristics.

The test results indicated conclusively that the pre-coated A-286 stainless-steel Hi-Set® fasteners, which employed the pre-treatment cadmium plate finish prior to the application of the Hi-Kote® 1 coating, exhibited excellent corrosion protection performance. The pre-treatment process of applying the cadmium plate without the subsequent chromate seal finish on the fasteners in lieu of stripping standard, full-up production cadmium plating with the subsequent chromate seal finish prior to pre-coating with Hi-Kote®1 revealed superior results when compared to results for wet-installed Hi-Set® fasteners pre-coated with Hi-Kote®1 coating on a standard prepared A-286 base material as well as the production titanium-alloy fasteners pre-coated with Hi-Kote® 1.

The A-286 Hi-Set® fasteners processed with the pre-treatment cadmium plate without the subsequent chromate seal finish prior to being pre-coated, out-performed the wet-sealant installed, standard processed A-286 material Hi-Set® fasteners pre-coated with Hi-Kote®1. The wet-sealant installation was performed in accordance with DPS2.50-17, Type 18.

Furthermore, the Hi-Set® A-286 fasteners processed with the pre-treatment cadmium plate without the subsequent chromate seal finish and subsequently pre-coated with Hi-Kote® 1 performed equivalently in protecting against exfoliation and pitting corrosion to that exhibited by the dry-installed, standard C-17 production titanium-alloy fasteners, which were pre-coated with Hi-Kote® 1.

Although a particular embodiment of the invention has been described in detail for purposes of illustration, various modifications and enhancements may be made without departing from the spirit and scope of the invention. Accordingly, the invention is not to be limited except as by the appended claims.

That which is claimed:

1. A method for coating a ferrous-alloy component comprising the steps of:
   providing a ferrous-alloy precursor having a pre-determined treatment temperature;
   subjecting the precursor to a metallic plate pre-treatment operation;
   abrasion cleaning the plated precursor;
   providing a curable organic coating material having a non-volatile portion that is curable at about the pre-determined ferrous-alloy heat-treatment temperature;
   applying the coating material directly to the plated component; and
   curing the coating material while heat-treating the ferrous-alloy precursor.

2. The method of claim 1, wherein the ferrous-alloy precursor is a heat-treatable, precipitation-hardenable stainless-steel material.

3. The method of claim 1, wherein the metallic plate pre-treatment operation is selected from the group consisting of a cadmium plate and a zinc-nickel alloy plate pre-treatment without a subsequent chromate or phosphate seal finish after pre-treatment.

4. The method of claim 1, wherein the metallic plate pre-treatment applies a metallic plating to the component to a minimum thickness of about 0.0002 inch.

5. The method of claim 1, wherein the curing step treats the coated, ferrous-alloy component to impart pre-determined metallurgical properties to the ferrous-alloy material, and concurrently cure the coating.

6. The method of claim 1, wherein the ferrous-alloy precursor is selected from the group consisting of 18-8, 17-4 PH, 17-7 PH, 15-5 PH, PH 13-8Mo, PH 15-7Mo, A-286, Custom 450, and Haynes 556 materials, wherein 18-8 includes about 66.5% iron, 18% chromium, 9% nickel, 3.5% copper, 2% manganese, and 0.75% cobalt; 17-4 PH includes about 76% iron, 16% chromium, 4.5% nickel, 3.5% copper, and 0.4% cobalt; 17-7 PH includes about 72.9% iron, 16.8% chromium, 7.6% nickel, 0.9% aluminum, 0.8% manganese, 0.3% molybdenum, and 0.3% copper; 15-5 PH includes about 76% iron, 15% chromium, 4.5% nickel, 3.5% copper, 1% manganese, and 0.4% cobalt; PH 13-8Mo includes about 75.8% iron, 12.6% chromium, 8.2% nickel, 2.2% molybdenum, 1% aluminum, 0.1% manganese, and 0.1% copper; PH 15-7Mo includes about 72% iron, 15% chromium, 7% nickel, 2.5% molybdenum, 1% manganese, and 1% aluminum; A-286 includes about 50% iron, 26% nickel, 15% chromium, 2.1% titanium, 1.3% molybdenum, 0.6% cobalt, and 0.5% manganese; Custom 450 includes about 75.5% iron, 15% chromium, 6% nickel, 1.5% copper, 1% manganese, 1% molybdenum and 0.4% cobalt; and Haynes 556 includes about 31% iron, 18% cobalt, 22% chromium, 3% molybdenum, 2.5% tungsten, 20% nickel, 0.6% tantalum, 0.2% nitrogen, 0.4% silicon, 1% manganese, 0.2% aluminum, 0.1% carbon, 0.02% lanthanum, and 0.02% zirconium.

7. The method of claim 1, wherein the coating is applied to the ferrous-alloy by a method selected from the group consisting of dipping, spraying, brushing, and fluidized-bed deposition.

8. The method of claim 1, further comprising the step of snap tempering the ferrous-alloy precursor before the metallic plate pre-treatment operation step.

9. The method of claim 1, further comprising a ferrous-alloy hardening treatment step wherein the hardening treatment step comprises austenitizing or normalizing the ferrous-alloy precursor.

10. The method of claim 1, wherein the organic coating material comprises an organic, phenolic resin mixed with at least one plasticizer and an inorganic additive selected from the group consisting of aluminum powder and strontium chromate.

11. The method of claim 1, wherein the organic coating material comprises polytetrafluoroethylene.

12. The method of claim 1, wherein the organic coating material is dissolved in a solvent selected from the group consisting of ethanol, toluene, methyl ethyl ketone (MEK), and mixtures thereof.

13. The method of claim 1, wherein the organic coating material comprises a sprayable solution having about 30 weight percent ethanol, about 7 weight percent toluene, about 45 weight percent methyl ethyl ketone (MEK), about 2 weight percent aluminum powder and about 2 weight percent strontium chromate.

14. The method of claim 12, further comprising the step of exposing the coated component to a temperature of from about 180° F. to about 220° F. for about two minutes to liberate the majority of solvent from the coating.

15. The method of claim 1, wherein a thickness of from about 0.0002 inch to about 0.0008 inch of the organic coating material is applied to the component.

16. A method for coating a ferrous-alloy component comprising the steps of:
- providing a ferrous-alloy precursor having a pre-determined treatment temperature;
- subjecting the precursor to a metallic plate pre-treatment operation, thereby applying a metallic plate with a minimum thickness of greater than 0.0002 inch;
- providing a curable organic coating material having a non-volatile portion that is curable at about the pre-determined ferrous-alloy heat-treatment temperature;
- applying the coating material directly to the plated component; and
- curing the coating material while heat-treating the ferrous-alloy precursor.

17. The method of claim 16, wherein the ferrous-alloy precursor is a heat-treatable, precipitation-hardenable stainless-steel material.

18. The method of claim 16, wherein the metallic plate pre-treatment operation is selected from the group consisting of a cadmium plate and a zinc-nickel alloy plate pre-treatment without a subsequent chromate or phosphate seal finish after pre-treatment.

19. The method of claim 16, wherein the metallic plate pre-treatment applies a metallic plating to the component with a thickness from about 0.0003 inch to about 0.0008 inch.

20. The method of claim 19, wherein the metallic plate pre-treatment applies a metallic plating to the component with a thickness from about 0.0005 inch to about 0.0008 inch.

21. The method of claim 16, wherein the curing step treats the coated, ferrous-alloy component to impart pre-determined metallurgical properties to the ferrous-alloy material, and concurrently cure the coating.

22. The method of claim 16, wherein the ferrous-alloy precursor is selected from the group consisting of 18-8, 17-4 PH, 17-7 PH, 15-5 PH, PH 13-8Mo, PH 15-7Mo, A-286, Custom 450, and Haynes 556 materials, wherein 18-8 includes about 66.5% iron, 18% chromium, 9% nicket, 3.5% copper, 2% manganese, and 0.75% cobalt; 17-4 PH includes about 76% iron, 16% chromium, 4.5% nickel, 3.5% copper, and 0.4% cobalt; 17-7 PH includes about 72.9% iron, 16.8% chromium, 7.6% nickel, 0.9% aluminum, 0.8% manganese, 0.3% molybdenum, and 0.3% copper; 15-5 PH includes about 76% iron, 15% chromium, 4.5% nickel, 3.5% copper, 1% manganese, and 0.4% cobalt; PH 13-8Mo includes about 75.8% iron, 12.6% chromium, 8.2% nickel, 2.2% molybdenum, 1% aluminum, 0.1% manganese, and 0.1% copper; PH 15-7Mo includes about 72% iron, 15% chromium, 7% nickel, 2.5% molybdenum, 1% manganese, and 1% aluminum; A-286 includes about 50% iron, 26% nickel, 15% chromium, 2.1% titanium, 1.3% molybdenum, 0.6% cobalt, and 0.5% manganese; Custom 450 includes about 75.5% iron, 15% chromium, 6% nickel, 1.5% copper, 1% manganese, 1% molybdenum and 0.4% cobalt; and Haynes 556 includes about 31% iron, 18% cobalt, 22% chromium, 3% molybdenum, 2.5% tungsten, 20% nickel, 0.6% tantalum, 0.2% nitrogen, 0.4% silicon, 1% manganese, 0.2% aluminum, 0.1% carbon, 0.02% lanthanum, and 0.02% zirconium.

23. The method of claim 16, wherein the coating is applied to the ferrous-alloy by a method selected from the group consisting of dipping, spraying, brushing, and fluidized-bed deposition.

24. The method of claim 16, further comprising the step of snap tempering the ferrous-alloy precursor before the metallic plate pre-treatment operation step.

25. The method of claim 16, further comprising a ferrous-alloy hardening treatment step wherein the hardening treatment step comprises austenitizing or normalizing the ferrous-alloy precursor.

26. The method of claim 16, wherein the organic coating material comprises an organic, phenolic resin mixed with at least one plasticizer and an inorganic additive selected from the group consisting of aluminum powder and strontium chromate.

27. The method of claim 16, wherein the organic coating material comprises polytetrafluoroethylene.

28. The method of claim 16, wherein the organic coating material is dissolved in a solvent selected from the group consisting of ethanol, toluene, methyl ethyl ketone (MEK), and mixtures thereof.

29. The method of claim 16, wherein the organic coating material comprises a sprayable solution having about 30 weight percent ethanol, about 7 weight percent toluene, about 45 weight percent methyl ethyl ketone (MEK), about 2 weight percent aluminum powder and about 2 weight percent strontium chromate.

30. The method of claim 28, further comprising the step of exposing the coated component to a temperature of from about 180° F. to about 220° F. for about two minutes to liberate the majority of solvent from the coating.

* * * * *